March 15, 1960 W. G. BUCKNER ET AL 2,928,417
CHECK VALVE
Filed Jan. 3, 1958

INVENTORS.
WILBUR G. BUCKNER
NORRIS J. BROWN

BY THEIR ATTORNEYS.
HARRIS, KIECH, FOSTER & HARRIS

United States Patent Office 2,928,417
Patented Mar. 15, 1960

2,928,417

CHECK VALVE

Wilbur G. Buckner, Los Angeles, and Norris J. Brown, Inglewood, Calif., assignors to Advanced Design and Development Company, Inglewood, Calif., a corporation of California Application January 3, 1958, Serial No. 707,026

4 Claims. (Cl. 137—538)

The present invention relates in general to valves and, more particularly, to a valve which includes: a housing having a passage therethrough and having an annular recess therein which encircles and is coaxial with a portion of the passage; an annular seal in the recess; and a poppet valve element movable in the housing between open and closed positions in the direction of the axis of the recess, the valve element having an annular flange which seats on the annular seal when in its closed position to prevent flow through the passage.

An important object of the invention is to provide a valve of the foregoing nature wherein the recess containing the annular seal communicates with the passage through a narrow annular throat which is coaxial with the recess and which faces generally axially of the recess, the annular flange on the valve element also facing generally axially of the recess and extending into the throat into engagement with the seal when the valve element is in its closed position.

Another and important object of the invention is to provide a valve wherein the angular extent of the throat in cross section is less than 180° and the angular extent of the recess in cross section is more than 180°.

Another and more specific object is to provide a valve wherein the angular extent of the throat in cross section is approximately one quadrant and wherein the angular extent of the recess in cross section is approximately three quadrants.

With the foregoing construction, the seal is positively retained within the recess and cannot be forced out of the recess through the throat by fluid flow through the passage, which is an important feature of the invention.

Another object is to provide a valve wherein the annular throat faces generally axially of the annular recess in the downstream direction and the annular flange on the valve element faces generally axially of the recess in the upstream direction for insertion into the annular throat and into engagement with the annular seal, the housing providing an annular flange which extends generally axially of the annular recess in the downstream direction and which encircles the passage inwardly of and defines the annular throat. This annular flange on the housing has the effect of diverting fluid flow through the passage away from the annular throat, thereby minimizing any tendency of fluid flow through the passage to displace the annular seal from its recess through the annular throat, which is an important feature.

Another object of the invention is to provide a valve wherein the annular seal is an O-ring of circular cross section and wherein the annular recess for the seal is defined by a wall of the housing which, in cross section, is a circular arc of more than 180° in angular extent and, more specifically, of approximately three quadrants in angular extent.

Another object is to provide a valve wherein the housing includes two interconnected housing members and includes a sleeve in one of the housing members and encircled by the annular recess and the annular throat and forming the annular housing flange mentioned, the wall of the annular recess, considered in cross section, being formed partly by one of the housing members, partly by the other housing member and partly by this sleeve. A related object is to provide a valve wherein each of these parts of the wall defining the annular recess has an angular extent of approximately one quadrant.

The construction outlined in the preceding paragraph facilitates assembly of various components of the valve while at the same time providing the annular recess with an angular extent in cross section of more than 180° and, more specifically, of approximately three quadrants, which is an important feature of the invention.

The foregoing objects, advantages, features and results of the present invention, together with various other objects, advantages, features and results thereof which will be evident to those skilled in the valve art in the light of this disclosure, may be attained with the exemplary embodiment of the invention which is described in detail hereinafter and illustrated in the accompanying drawing, wherein.

Figure 1:
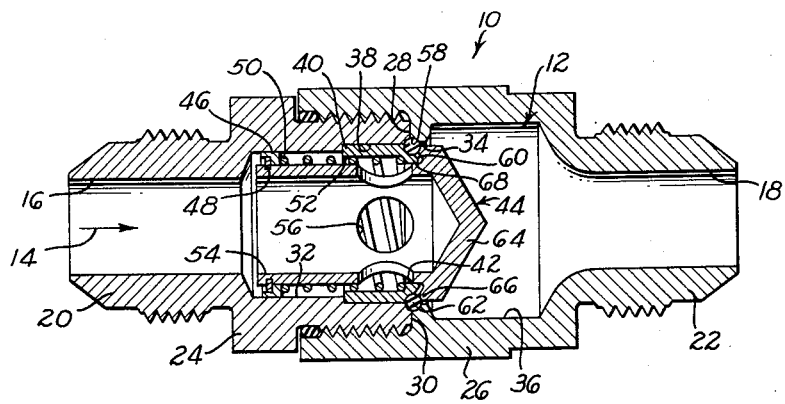
Fig. 1 is a longitudinal sectional view of a check valve which embodies the invention, a poppet valve element of the check valve being shown in its closed position.

In the drawing, the numeral 10 designates generally a housing having a flow passage 12 therethrough, the flow through this passage being in the direction of the arrows 14. The passage 12 includes inlet and outlet ports 16 and 18 in inlet and outlet fittings 20 and 22 which may be externally threaded as shown for connection into any desired system with which the check valve is to be used.

The housing 10 includes two housing members 24 and 26, hereinafter sometimes referred to as a body and a cap, respectively. The cap 26 is threaded onto the body 24 and is provided with an annular shoulder 28 which is seated against an annular shoulder 30 on the body. The passage 12 includes a counterbore 32 in the body 24 of the housing 10, and includes a counterbore 34 in the cap 26 adjacent the interengaged shoulders 28 and 30, the passage further including an enlarged cylindrical cavity 36 in the cap between the counterbore 34 and the outlet port 18.

Figure 3:
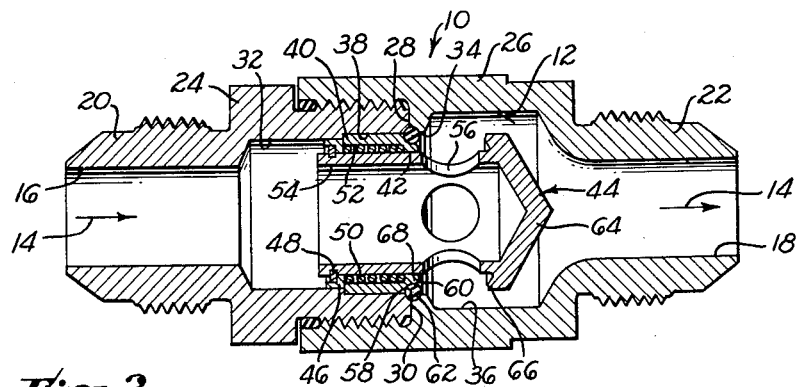
Fig. 3 is a view duplicating Fig. 1, but illustrating the poppet valve element of the check valve in its open position.

Pressed into a counterbore 38 in the body 24 of the housing 10 and projecting past the interengaged shoulders 28 and 30 into the cap 26 is a sleeve 40 which also forms part of the housing 10 and which is provided with a bore 42 slidably receiving the body of a poppet or poppet valve element 44 capable of movement axially of the housing 10 between a closed position, as shown in Fig. 1, and an open position, as shown in Fig. 3. The poppet 44 is provided thereon with a washer 46 which is retained by a ring 48 and which is slidable in the counterbore 32 in the body 24 of the housing 10, the poppet thus being guided for movement between its closed and open positions by engagement of the washer 46 with the wall of the counterbore 32 and by engagement of the body of the poppet with the wall of the bore 42. A compression spring 50 disposed in a counterbore 52 in the sleeve 40 and seated at one end against the bottom of this counterbore and at its other end against the washer 46 biases the poppet 44 toward its closed position.

The poppet 44 is provided therein with a bore 54 one end of which communicates with the counterbore 32 in the body 24, and the other of which communicates with radial ports 56. When the poppet 44 is in its open position, the ports 56 communicate with the counterbore 34 and the enlarged cavity 36 in the cap 26 to permit flow through the passage 12. However, when the poppet 44 is in its closed position, such communication between the ports 56 and the counterbore 34 and the enlarged cavity 36 is prevented in a manner to be described.

The housing 10 is provided therein with a coaxial annular recess 58 which encircles a portion of the flow passage 12 and which is located radially outwardly therefrom, the annular recess 58 communicating with the flow passage through a narrow annular throat 60 which faces generally axially in the downstream direction. Disposed in the annular recess 58 is an annular seal 62 in the form of an O-ring, the poppet 44 being provided with a head 64 having thereon an annular flange 66 which faces generally axially in the upstream direction and which is insertable into the annular throat 60 into sealing engagement with the seal 62 when the poppet 64 is in its closed position. Under such circumstances, fluid flow through the passage 12 cannot occur.

Figure 2:
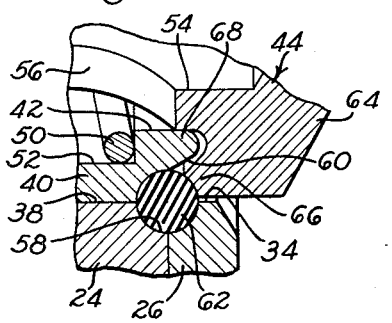
Fig. 2 is a fragmentary sectional view duplicating a portion of Fig. 1 on an enlarged scale for clarity.

An important aspect of the present invention is that the angular extent of the annular recess 58 in cross section exceeds 180° and the angular extent of the annular throat 60 in cross section is less than 180°. More specifically, the angular extent of the annular recess 58 in cross section is approximately three quadrants while the angular extent of the annular throat 60 in cross section is only approximately one quadrant, as clearly shown in Fig. 2 of the drawing in particular. With this construction, the seal 62 is positively retained in the annular recess 58 against displacement out of such recess through the throat 60 by fluid flow through the passage 12, which is an important feature of the invention.

Another important feature is that the sleeve 40 of the housing 10 provides an annular flange 68 which extends generally axially in the downstream direction and which is located radially inwardly of and defines the inner peripheral wall of the annular throat, the flange 68 telescoping into the flange 66 on the poppet head 64 when the poppet 44 is in its closed position.

With this construction, the flange 68 on the sleeve 40 tends to divert the fluid flow away from the seal 62, and thus further minimizes any tendency of the flow to displace the seal from the recess 58 through the throat 60.

Another effect of the construction described is a poppet head 64 of minimum size, it being noted that the construction described is such that the poppet head is but slightly larger than the body thereof. Consequently, deviation of the fluid flow path through the housing 10 from a straight line is held to a minimum with the result that turbulence is minimized and an exceptionally low pressure drop achieved, these being important features also.

The wall of the annular recess 58, considered in cross section, is formed partly on the body 24 of the housing 10, partly on the cap 26, and partly on the sleeve 40, each of these parts of the recess wall being of approximately one quadrant in angular extent. With this construction, the desired angular extent of more than 180° for the recess 58, considered in cross section, is achieved, but at the same time providing a construction the components of which may be assembled readily with the seal 62 in the recess 58. In other words, since approximately two quadrants of the three-quadrant wall of the recess 58 are formed on the body 24 and the sleeve 40, respectively, the seal 62 may be inserted into such quadrants readily. Thereafter, the cap 26 is threaded onto the body 24, thereby bringing the third quadrant of the wall of the recess 58 into a position to lock the seal 62 in the recess 58. Thus, with this specific construction of the housing 10, the desired angular extent of the recess 58 in cross section is achieved while maintaining ease of installation of the seal 62 in such recess, which is an important feature.

Although an exemplary embodiment of the invention has been disclosed herein for purposes of illustration, it will be understood that various changes, modifications and substitutions may be incorporated in such embodiment without departing from the spirit of the invention as defined by the claims which follow:

We claim as our invention:

1. A valve including a housing having a passage therethrough and having an annular recess therein which encircles and is located outwardly of and coaxial with a portion of said passage, said housing also having a narrow annular throat which is coaxial with said recess and which faces generally axially of said recess, said throat having an angular extent in cross section of approximately one quadrant and said recess having an angular extent in cross section of approximately three quadrants, an annular seal in said recess, and a poppet valve element movable in said housing between closed and open positions in the direction of the axis of said recess, said valve element having an annular flange which faces generally in the direction of the axis of said recess and which extends into said throat and into engagement with said seal when said valve element is in said closed position, said housing including two interconnected housing members and including a sleeve in one of said housing members and encircled by said recess and said throat, said recess being defined by a wall which, in cross section, is formed partly by said one housing member, partly by the other and partly by said sleeve, said valve element being disposed within said sleeve in slidable engagement with at least an annular portion thereof so that said valve element is guided by said sleeve.

2. A valve according to claim 1 wherein each of the parts of said wall of said recess which are formed by said one housing member, said other housing member and said sleeve has an angular extent in cross section of approximately one quadrant.

3. A value according to claim 1 wherein said seal is circular in cross section and said wall of said recess is a circular arc in cross section having an angular extent of approximately three quadrants and a diameter in cross section substantially equal to that of said seal in cross section.

4. A valve according to claim 1 wherein at least an annular portion of said valve element is in slidable engagement with said one housing member so that said valve element is guided by said one housing member also, said valve including a compression spring biasing said valve element toward its closed position and encircling said valve element within said sleeve and seated at its ends against said annular portions of said sleeve and said valve element, respectively.

References Cited in the file of this patent

UNITED STATES PATENTS

| | | |
|---|---|---|
| 1,353,415 | Newson | Sept. 21, 1920 |
| 2,650,793 | Clark | Sept. 1, 1953 |
| 2,670,922 | Carlisle | Mar. 2, 1954 |
| 2,690,360 | Young | Sept. 28, 1954 |

FOREIGN PATENTS

| | | |
|---|---|---|
| 12,911 | Great Britain | June 7, 1904 |
| 750,738 | Great Britain | June 20, 1956 |